United States Patent
Sawal et al.

(10) Patent No.: US 12,314,671 B2
(45) Date of Patent: May 27, 2025

(54) SYSTEM AND METHOD FOR MANAGEMENT OF SYSTEMS USING MULTISTAGE LEARNING

(71) Applicant: Dell Products L.P., Round Rock, TX (US)

(72) Inventors: Vinay Sawal, Fremont, CA (US); Anne-Marie McReynolds, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 419 days.

(21) Appl. No.: 18/150,535

(22) Filed: Jan. 5, 2023

(65) Prior Publication Data

US 2024/0232536 A1 Jul. 11, 2024

(51) Int. Cl.
   *G06F 16/00* (2019.01)
   *G06F 40/30* (2020.01)
   *G06N 5/022* (2023.01)

(52) U.S. Cl.
   CPC .......... *G06F 40/30* (2020.01); *G06N 5/022* (2013.01)

(58) Field of Classification Search
   CPC ........ G06Q 10/063118; G06Q 40/125; G06Q 30/0283; G06Q 20/10; G06Q 30/0601; G06Q 10/20; G06Q 30/04; G06Q 30/0222; G06Q 10/10; G06Q 40/123; G06Q 40/12; G06Q 40/00; G06Q 40/04; G06Q 10/087; G06Q 10/06; G06Q 10/0635; G06Q 10/06311; G06Q 10/00; G05B 9/02; G08B 21/02
   See application file for complete search history.

(56) References Cited

U.S. PATENT DOCUMENTS

| | | | |
|---|---|---|---|
| 10,587,545 B1 * | 3/2020 | Bitoun | H04L 51/046 |
| 12,001,978 B1 * | 6/2024 | Keane | G06Q 10/063118 |
| 2008/0120129 A1 * | 5/2008 | Seubert | G06Q 40/125 |
| | | | 705/305 |
| 2020/0210912 A1 * | 7/2020 | Buhulaiga | G05B 9/02 |

* cited by examiner

*Primary Examiner* — Yicun Wu
(74) *Attorney, Agent, or Firm* — WOMBLE BOND DICKINSON (US) LLP

(57) ABSTRACT

Methods and systems for managing undesired operation of managed systems are disclosed. To manage the undesired operation, information regarding the undesired operation may be obtained. A multistage learning process may be performed to identify likely root causes for the undesired operation using the obtained information. Remediation processes based on the likely root causes may be performed to reduce the likelihood of the undesired operation from occurring in the future.

20 Claims, 9 Drawing Sheets

SYSTEM AND METHOD FOR MANAGEMENT OF SYSTEMS USING MULTISTAGE LEARNING

FIELD

Embodiments disclosed herein relate generally to operation management. More particularly, embodiments disclosed herein relate to systems and methods to manage undesired operation of managed systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
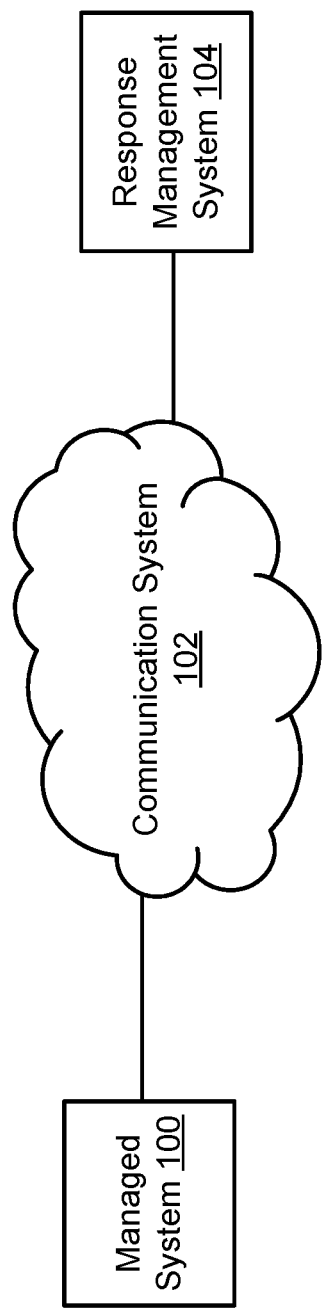
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing undesired operation of managed systems. To manage the undesired operation, information regarding jobs that were performed but that were performed undesirably may be obtained.

Due to the quantity of obtain information, a root cause for the undesired operation may not be explicitly indicated by the information. To identify the root cause, a multistage learning process may be performed that may identify a narrowed set of root causes that are likely to have contributed to the undesired operation.

The narrowed set of root causes may be used to remediate the undesired operation. By remediating the undesired operation using the narrowed set of root causes, the time to address the undesired operation may be reduced.

By doing so, a system in accordance with embodiments disclosed herein may reduce the prevalence of undesired operation of managed system, may reduce the time spent may service agents tasked with remediating the undesired operation, and/or may improve the uptime of the managed systems (e.g., in scenarios in which the undesired operation effectively deprive the managed system from effective use by user).

Thus, embodiments disclosed herein may address the technical problem of resource limitations in response management systems. Due to limited availability of resources, only certain numbers and types of remediation processes may be implemented per unit time. By ranking remediation processes described by knowledge base articles, embodiments disclosed herein may reduce the suffering of the customers subject to the customer-encountered issues through reduced time to resolution and may improve the capacity of customer-encountered issues that may be reduced per unit time.

In an embodiment, a method for managing job impairments is provided. The method may include obtaining job traces for instances of a type of a job; performing causality profile modeling on the job traces to obtain causality profile batches, each batch of the causality profile batches being obtained using a same modeling technique; performing topic modeling on each of the causality profile batches to obtain causal topic batches corresponding to the causality profile batches; performing clustering on the causal topic batches to obtain final causal topics; performing root cause analysis for an impairment of a job of the type of the job using the final causal topics; and performing an action set based on the root cause analysis to reduce a likelihood of future jobs of the type of the job being impaired.

Performing the causality profile modeling may include, for a job trace of the job traces: identifying dependencies between explanatory variables and response variables of the job trace to obtain a first set of dependencies; generating a first causality profile of a first causality profile batch of the causality profile batches using the first set of dependencies; identifying causal relationships based on the explanatory variables and the response variables of the job trace to obtain a first set of causal relationships; and generating a second causality profile of a second causality profile batch of the causality profile batches using the first set of causal relationships.

The first causality profile may include quantifications regarding dependency of a response variable of the response variables with respect to the explanatory variables, and the response variable is based on the impairment. The second causality profile may include quantifications regarding causal effect of the response variable with respect to the explanatory variables.

Performing the topic modeling may include, for the first causality profile batch: treating each causality profile of the first causality profile batch as mixture of topics, and each of the topics as a mixture of words; and performing a statistic inferencing process to identify a distribution of the topics, and word probabilities for the topics.

Performing the clustering on the causal topic batches to obtain the final causal topics may include identify a first causal topic that is an outlier; and excluding the first causal topic from the final causal topics.

Performing the clustering on the causal topic batches to obtain the final causal topics further may include identifying a set of causal topics of the causal topic batches that each have explanatory content regarding the impairment that is similar within a threshold of each other; and obtaining a final causal topic based on the set of causal topics.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of managed system 100. Managed system 100 may provide the computer implemented services to users of managed system 100 and/or to other devices (not shown). Different managed systems may provide similar and/or different computer implemented services.

To provide the computer implemented services, managed system 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

To provide certain computer implemented services, the hardware and/or software components may need to operate in predetermined manners. If the hardware and/or software components do not operate in the predetermined manners, then a managed system may be unable to provide all, or a portion, of the computer implemented services that it normally provides.

The hardware and/or software components of managed system 100 may operate differently (e.g., in an undesirable manner) from the predetermined manners for any number of reasons (e.g., these reasons may also be referred to as "root causes"). For example, any of the hardware and/or software components may malfunction. In another example, the hardware and/or software components may be operating nominally but in undesirable manners through various interactions such as resource conflicts or constraints. In a further example, various configuration settings of the hardware and/or software components may be set (intentionally or inadvertently) in a manner that causes the operation of any of managed system 100 to be undesirable. The hardware and/or software components of managed system 100 may operate differently from the predetermined manners for other reasons (e.g., various root causes) without departing from embodiments disclosed herein. Thus, a managed system may not provide its computer implemented services for any number of reasons which may be difficult to identify.

The undesired operation of managed system 100 may take any number of forms which may be linked to a root cause (or multiple root causes) of the undesired operation. For example, an undesired operation of a managed system may be a lack of operation such as failing to power on when a power button is depressed. In another example, an undesired operation of a managed system may be a failure of the managed system to utilize a full width of a display when presenting information to a user via the display. In a further example, an undesired operation of a managed system may be inconsistent operation of the managed system over time such as the managed system intermittently freezing for periods of time during which the managed system is unresponsive to a user and/or other devices. The undesired operation of managed system 100 may manifest in other manners without departing from embodiments disclosed herein. Thus, a managed system may manifest any number of undesired operations which may be due to any number of root causes.

To improve the likelihood of managed system 100 providing desired computer implemented services, the system of FIG. 1 may include response management system (RMS) 104. RMS 104 may be tasked with addressing undesired operation of managed system 100 (and/or any number of managed system and/or other types of systems not shown in FIG. 1).

However, RMS 104 may have limited resources with which to address the undesired operation of managed system 100. Consequently, when an undesired operation of managed system 100 is identified, there may be a delay between when the undesired operation is identified and when the undesired operation is resolved.

In general, embodiments disclosed herein may provide methods, systems, and/or devices for managing undesired operations of managed system 100. To manage the undesired operation of managed system 100, RMS 104 may provide remediation services to address the undesired operation of managed system 100.

The remediation services may include performance of a multistage learning process to narrow the potential root causes for the undesired operation of managed system 100. By narrowing the potential root causes, the duration of time between when undesired operations are identified and resolved may be reduced (e.g., when compared to the duration of time when the potential root causes are not narrowed).

For example, managed system 100 may be tasked with performing various jobs. The jobs may include, for example, processing of certain types of data, generating and storing backups of data, etc. The jobs may be expected to be completed in accordance with corresponding performance metrics (e.g., evaluation criteria). The performance metrics may include, for example, expected durations of time between when a job is initiated and completed, expected quantities of computing resources (e.g., processor cycles, memory space, storage space, network bandwidth, etc.) to be expended for job completion, etc. If performance of a job does not meet these performance metrics, then performance of the job may be treated as an undesired operation.

To remediate the undesired operation, the operation of managed system 100 may need to be modified. To do so, the root cause of the undesired operation may need to be identified so that a corresponding modification to address the root cause may be performed. During performance of the job, large amounts of data regarding the operation of managed system 100 may be collected. While the root cause may be identified using the large amounts of data, the relationship between the large amounts of data and the root cause may not be explicit.

For example, the large amounts of data may include information regarding some operations of managed system 100 that appear entirely unrelated to the root cause. However, the information may actually be probative of the root cause for the undesired operation.

The multistage learning process may ingest the data and sift through it in a manner to narrow the potential root causes (e.g., from all possible root causes) to a tractable number of root causes that are likely to cause the undesired operation. The tractable number of root causes may then be used to selection actions to attempt to remediate the undesired operation.

By remediating the undesired operation, future job performances similar to that of the job identified as being undesirable operations may be more likely to meet the performance metrics for the future jobs. Consequently, managed system 100 (and/or other systems to which the remediation may also be applied) may be less likely to operate undesirably in the future.

Figure 2A:
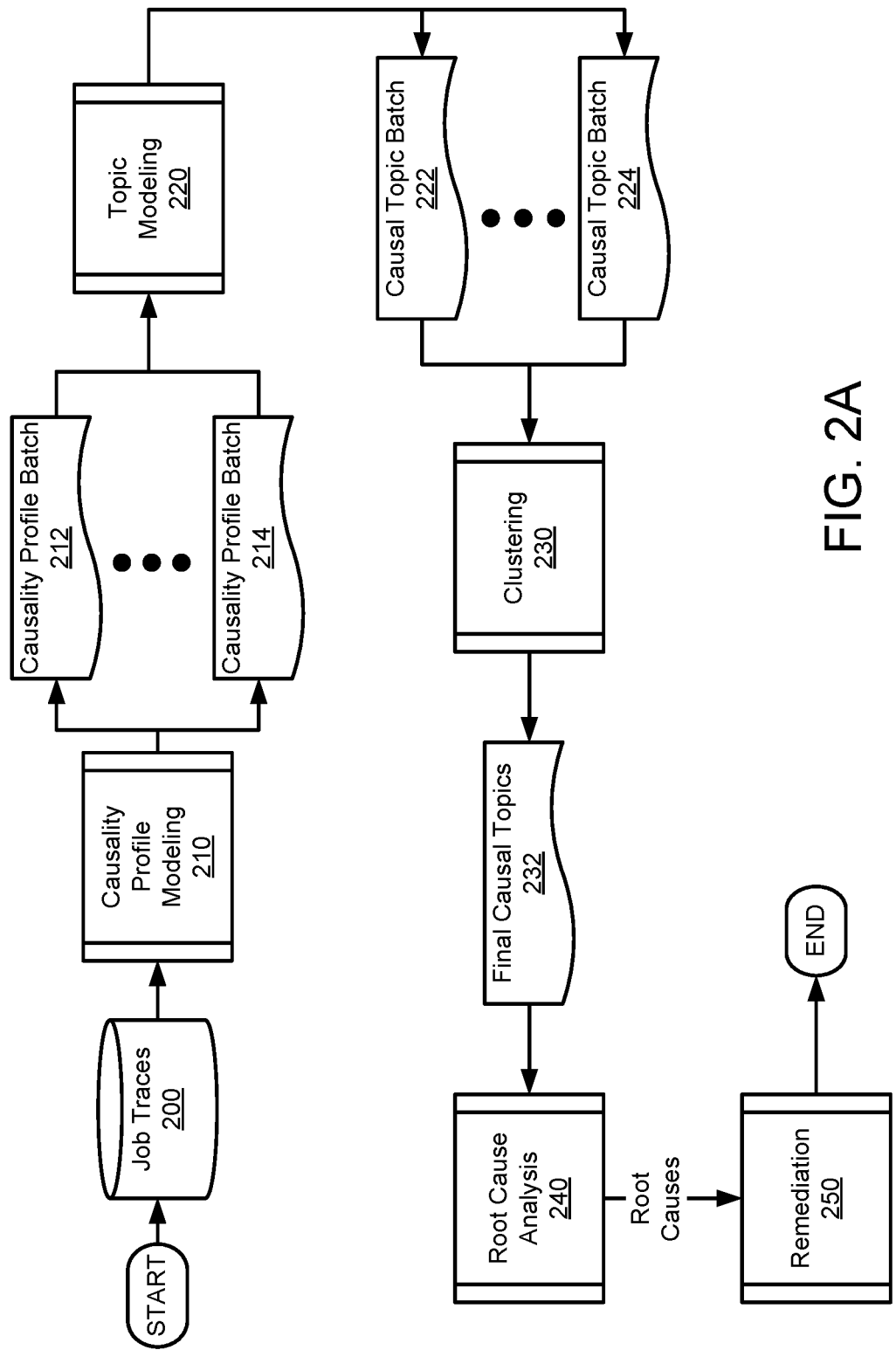
FIGS. 2A-2F show diagrams illustrating data flows, processes, and other aspects of a system in accordance with an embodiment.

To provide the remediation services, RMS 104 may (i) obtain information regarding the operation and/or other characteristics of managed system 100 (e.g., also referred to in aggregate as "job traces") during performance of a job that is identified as being an undesirable operation, (ii) perform a multistage learning process using the job traces to narrow the number of root causes to a tractable number of root causes, (iii) identify actions based on the tractable number of root causes, and/or (v) perform a remediation of a managed system based on the identified actions to reduce the likelihood of undesirable operations occurring in the future. Refer to FIG. 2A for additional details regarding remediating undesired operation of a managed system.

Figure 3:
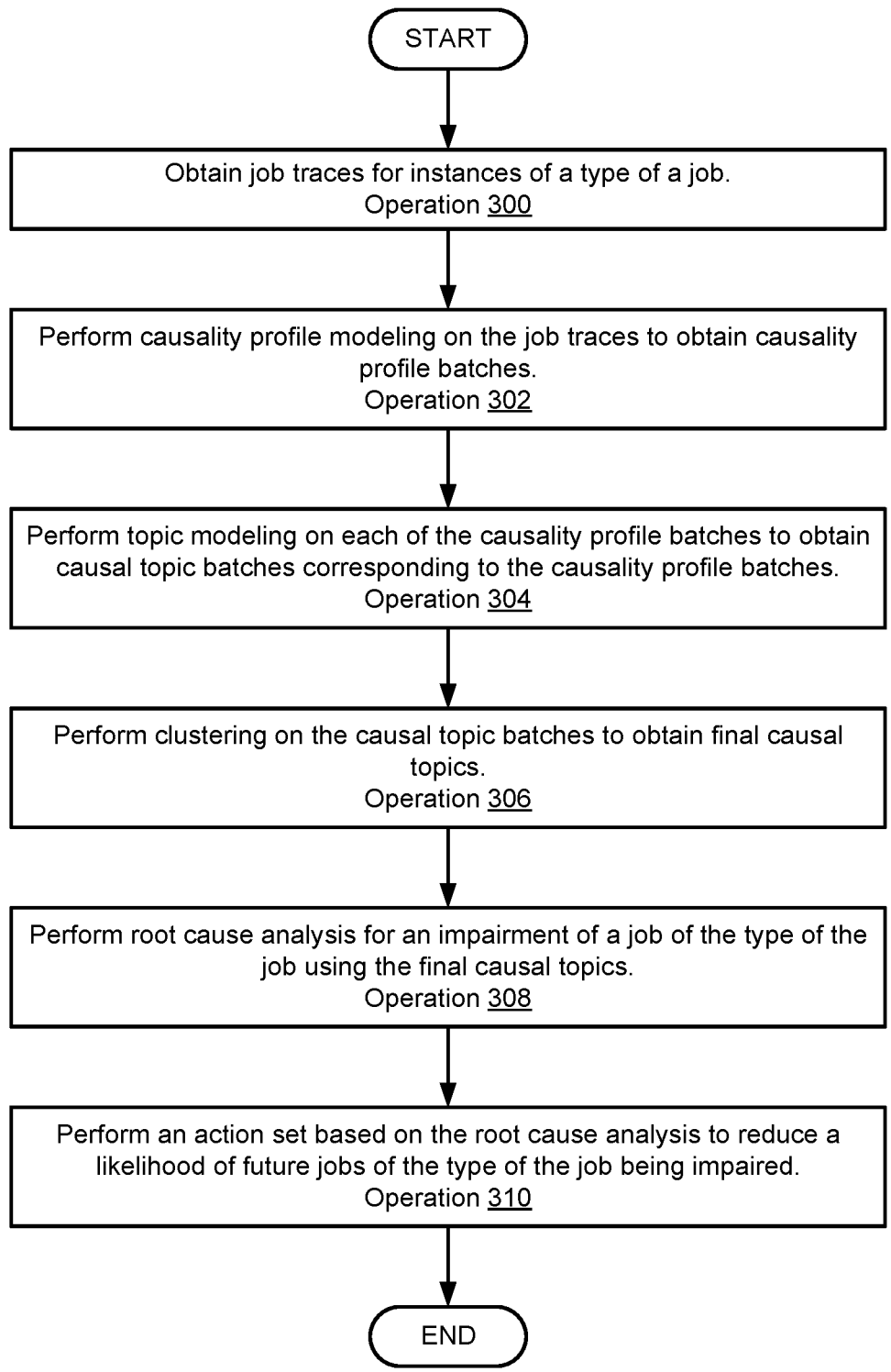
FIG. 3 shows a flow diagram illustrating a method of remediating undesired operation of managed systems in accordance with an embodiment.

When providing its functionality, RMS 104 may perform all, or a portion, of the method illustrated in FIG. 3.

Any of managed system 100 and/or RMS 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

RMS 104 may be implemented with multiple computing devices. The computing devices of RMS 104 may cooperatively perform processes for managing customer-encountered issues. The computing devices of RMS 104 may perform similar and/or different functions, and may be used by different persons that may participate in the management of the customer-encountered issues. For example, RMS 104 may include multiple computing devices used by different service agents (e.g., persons) tasked with resolving undesired operation of managed systems. The service agents may attempt remediations of the undesired operations using the narrowed root causes identified via the multistage learning.

RMS 104 may be maintained, for example, by a business or other entity that has some degree of responsibility with respect to maintaining the operation of managed system 100. For example, RMS 104 may be operated by a business that sells managed system 100 and provides warranty or other types of support for managed system 100 to users and/or owners thereof. In another example, RMS 104 may be operated by a business that owns managed system 100 and uses managed system 100 in the operation of the business.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-2F. In FIGS. 2A-2F, data structures are represented using a first set of shapes (e.g., 200, 212, 214, etc.) and processes are represented using a different set of shapes (e.g., 210, 220, etc.).

Turning to FIG. 2A, a data flow diagram illustrating data flows, data processing, and/or other operations that may be performed by RMS 104 in accordance with an embodiment is shown.

To manage undesired operations of a managed system, RMS 104 may obtain job traces 200. Job traces 200 may include one or more data structures that include information regarding the undesired operation. For example, the data structures may include logs or other types of data structures that include information reflecting the operation of the managed system (e.g., prior to, during, and/or after the undesired operation). Each of job traces 200 may correspond to a different undesired operation exhibited by the managed system Job traces 200 may be obtained by (i) obtaining information regarding the undesired operation and (ii) adding the obtained information to a new or existing data structure (e.g., thereby establishing a corpus of information regarding the undesired operation). The information may be obtained, for example, by (i) receiving the information via a portal (e.g., a website), (ii) receiving the information via phone calls, video calls, instant messages, and/or via other types of interactions with users (which may be subsequently subjected to processing to derive recordable information regarding the user and the customer encounter issue), (iii) receiving the information via an agent hosted by the managed system, and/or (iv) via other methods.

Once a job trace is obtained, the job trace may be used to obtain one more causality profiles via causality profile modeling 210. Causality profile modeling 210 may include (i) ingesting a job trace by one or more models that extract relationships between explanatory and response variables in the job trace and (ii) establishing causality profiles for the respective models based on the relationships identified using the respective models.

The one or more models may include (i) a dependency measurement models, (ii) a causality model, and (iii) any number of other models. The dependency measurement model may, for the variables within a job trace, identify dependencies between variables by comparison the distributions of the variables thereby obtaining a first set of relationships. The causality model may, for the variables within the job trace, estimate the effect of explanatory variables on response variables while controlling for all other confounding variables thereby obtaining a second set of relationships.

The sets of relationships may then be used to populate a causality profile for a causality profile batch corresponding to a model used during causality profile modeling. For example, turning to FIG. 2B, a second data flow diagram illustrating an example of causality profile modeling 210 in accordance with an embodiment is shown. Now, consider an example scenario where a backup job performed by a managed system was considered to be an undesired operation because the duration for completion of the job exceeded a time limit for the job.

Figure 2B:
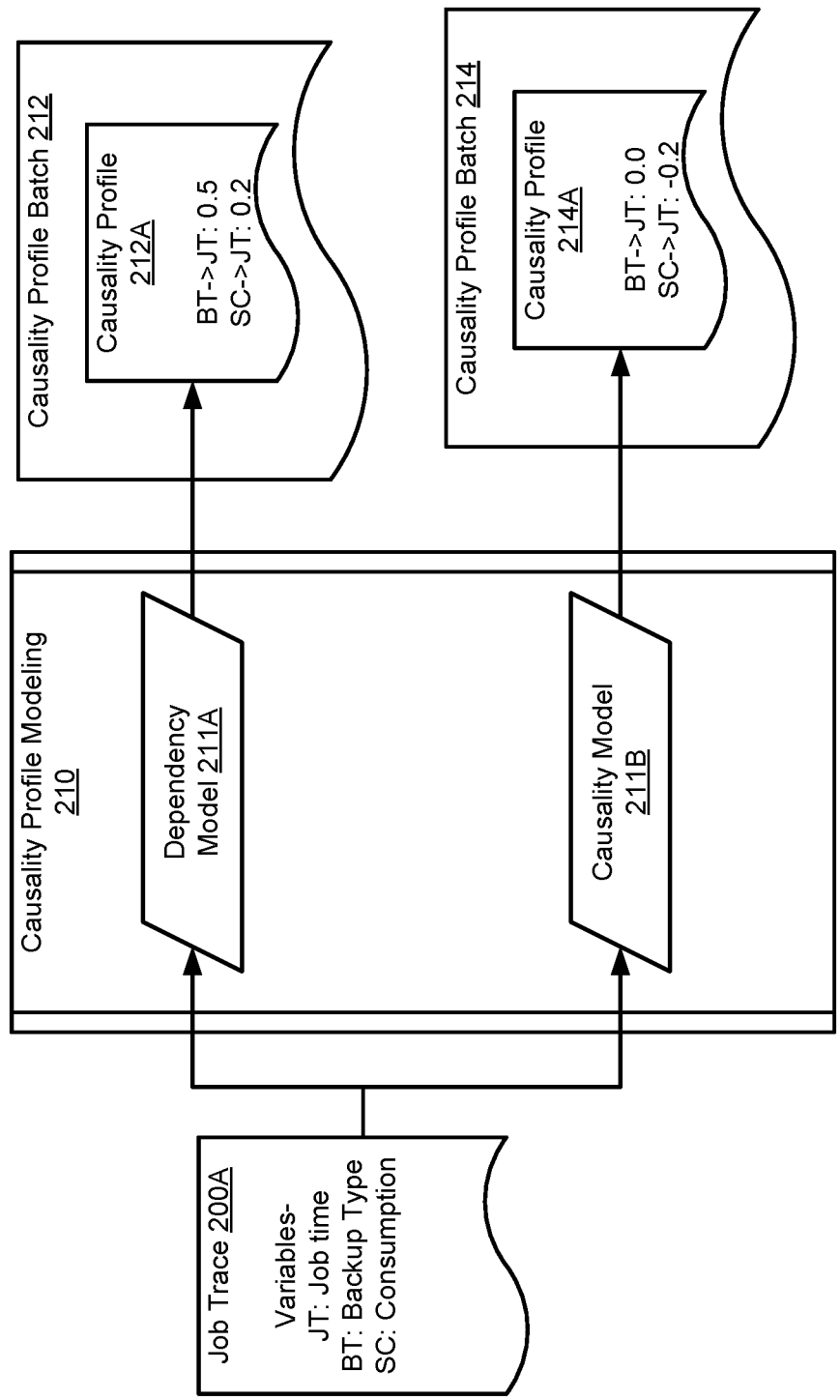

As seen in FIG. 2B, a job trace (e.g. 200A) of job traces 200 may include three monitored variables, JT (representing the job processing time, in this example the characteristic of the job performance that caused the job to be considered and undesirable operation), BT (representing the type of the job, in this case a backup type), and SC (representing a quantity of streams consumed during performance of the job). Job trace 200A may be ingested into dependency model 211A and causality model 211B.

Dependency model 211A may, through the ingestion, generate causality profile 212A. Causality profile 212A may indicate that the job time has a dependency of 0.5 with respect to the type of the job, and a dependency of 0.2 with respect to the number of stream consumed.

Causality model 211B may, through the ingestion, generate causality profile 214A. Causality profile 214A may indicate that the job time has a causal link of 0.0 with respect to the type of the job, and a causal link of −0.2 with respect to the number of stream consumed. Thus, as seen in FIG. 2B, through use of a diverse array of models, causality profile modeling 210 may generate causality profiles corresponding to any number of causality profile batches 212. By using a diverse array of models, bias introduced via these modeling methods may be identified and reduced (or eliminated) thereby improving the likelihood that a root cause for the undesired operation may be discriminated from other potential root causes that did not actually contribute to the undesired operation.

Returning to the discussion of FIG. 2A, causality profile modeling 210 may be performed for any number of instances of a job type (e.g., through use of different job traces of job traces 200) that are considered to be undesirable operations thereby generating a number of causality profiles for each causality profile batch (e.g., 212, 214).

Once the causality profile batches are obtained, the causality profile batches may be used to obtain one more causal topic batches (e.g., 222, 224) via topic modeling 220. Topic modeling 220 may include, for each of the causality profiles in a batch, (i) treating each of the causality profiles of the batch as a document, (ii) evaluating the effect of each word within the respective document on the undesired operation, (iii) establishing clusters of words based on the effect of each word, and (iv) obtaining topics based on the word clusters. For example, the latent dirichlet allocation (LDA) method may be used to identify topics, keywords for the topics, and weights for the keywords.

The topics, keywords, and weights may then be used to populate a causality topic batch (e.g., 222) corresponding to a causality profile batch (e.g., 212). This process may be repeated to obtain any number of causality topic batches (e.g., 222, 224).

Figure 2C:
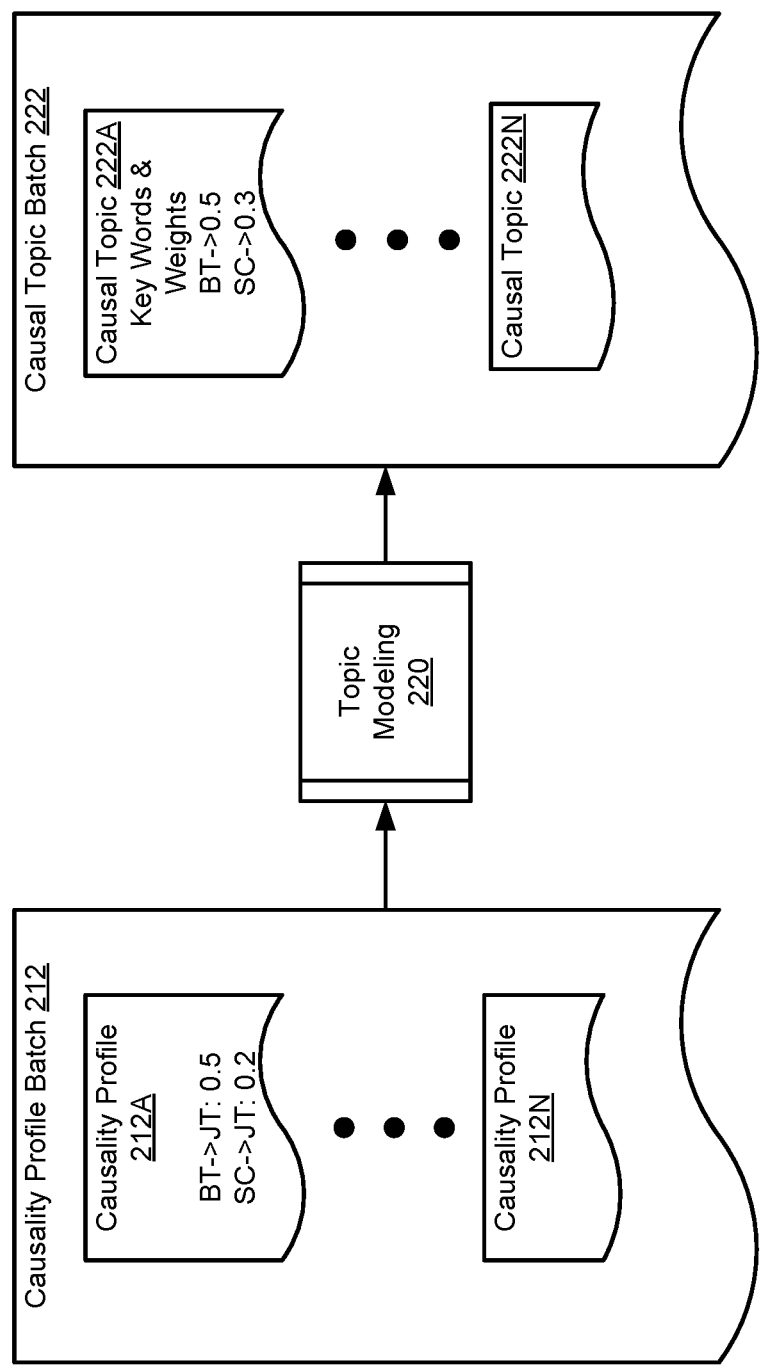

For example, turning to FIG. 2C, a third data flow diagram illustrating an example of topic modeling 220 in accordance with an embodiment is shown. Returning to the example scenario described with respect to FIG. 2B, each of the causality profiles of causality profile batch 212 may be processed to obtain any number of causal topics (e.g., 222A, 222N). Each of the causal topics may include words for the topic and weights for each of the words.

For example, causal topic 222A may include the words BT and SC, with weights of 0.5 and 0.3 respectively. Different causal topics may include different sets of words and corresponding weights.

Once the casual topics of a causal topic batch (e.g., 222) are obtained, the causal topics may then be mapped to each of the jobs considered to be undesirable operations. For example, the words and weights may be compared to the word distributions in the job traces corresponding to the jobs. Other mapping processes may be used without departing from embodiments disclosed herein.

The resulting mappings to each job may indicate the relative level of contribution on the topic to the undesired operation associated with the job. For example, turning to FIG. 2D, a fourth data flow diagram illustrating an example set of topic to job mappings in accordance with an embodiment is shown.

Figure 2D:
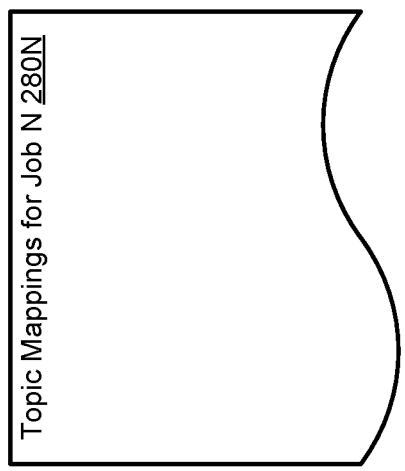
Figure 2D:
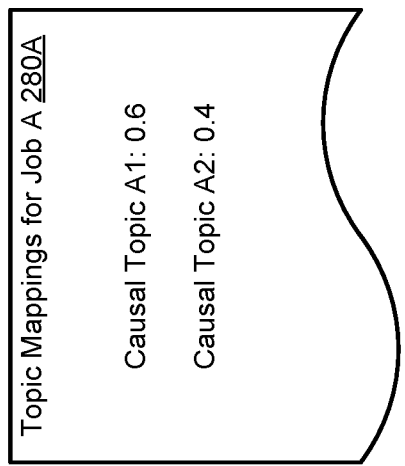

In FIG. 2D, the example topic mappings are based on causal topic batch 222. It will be appreciated that any number of causal topic batches may be obtained for any number of causality profile batches. For simplicity of explanation, in the following description and figures causal topics obtained from causal topic batch 222 are designated as A series topics (e.g., with A1 indicating a first of the topics, A2 indicating a second of the topics, etc.), and causal topics obtained from causal topic batch 224 are designed as B series topics.

As seen in FIG. 2D, each of the topic mappings (e.g., 280A, 280N) may indicate the level of contribution for the undesired operation of a job with respect to each topic. For example, topic mappings for job A 280A specifies that job A is considered to be an undesirable operation (e.g., due to excessive job duration) due to causal topic A1 with a 60% weight, and causal topic A2 with a 40% weight. Thus, causal topics A1 and A2 may be treated as the narrowed set of root causes for job A exceeding the job duration criteria.

During the mapping process, the number of causal topics to which a job may be mapped may be limited (e.g., to a predetermined number). Consequently, the number of root causes may be narrowed to a maximum number of root causes. The mapping may be limited, for example, by rank ordering the causal topics based on the corresponding weights to the job and using a certain number of the causal topics based on the rank ordering.

Returning to the discussion of FIG. 2A, once the causality topic batches (e.g., 222, 224) are obtained, the causality topic batches may be used to obtain final causal topics 232 via clustering 230. Clustering 230 may include, for all of the causal topics in the causal topics batches (e.g., 222, 224), (i) establishing clusters of causal topics based on the explanations (e.g., the explanatory variables) for the undesired operation indicated by the causal topics, (ii) filtering the clusters based on the cluster size (e.g., clusters having membership of causal topics that fall below a threshold may be filtered out), and (iii) obtaining a final causal topic for each of the clusters remaining after filtering. For example, agglomerative hierarchical clustering and filtering may be used to obtain the filtered clusters, and the weight of each explanatory variable of each cluster may be statistically analyzed to obtain a weight of a corresponding variable for a final causal topic.

Figure 2E:
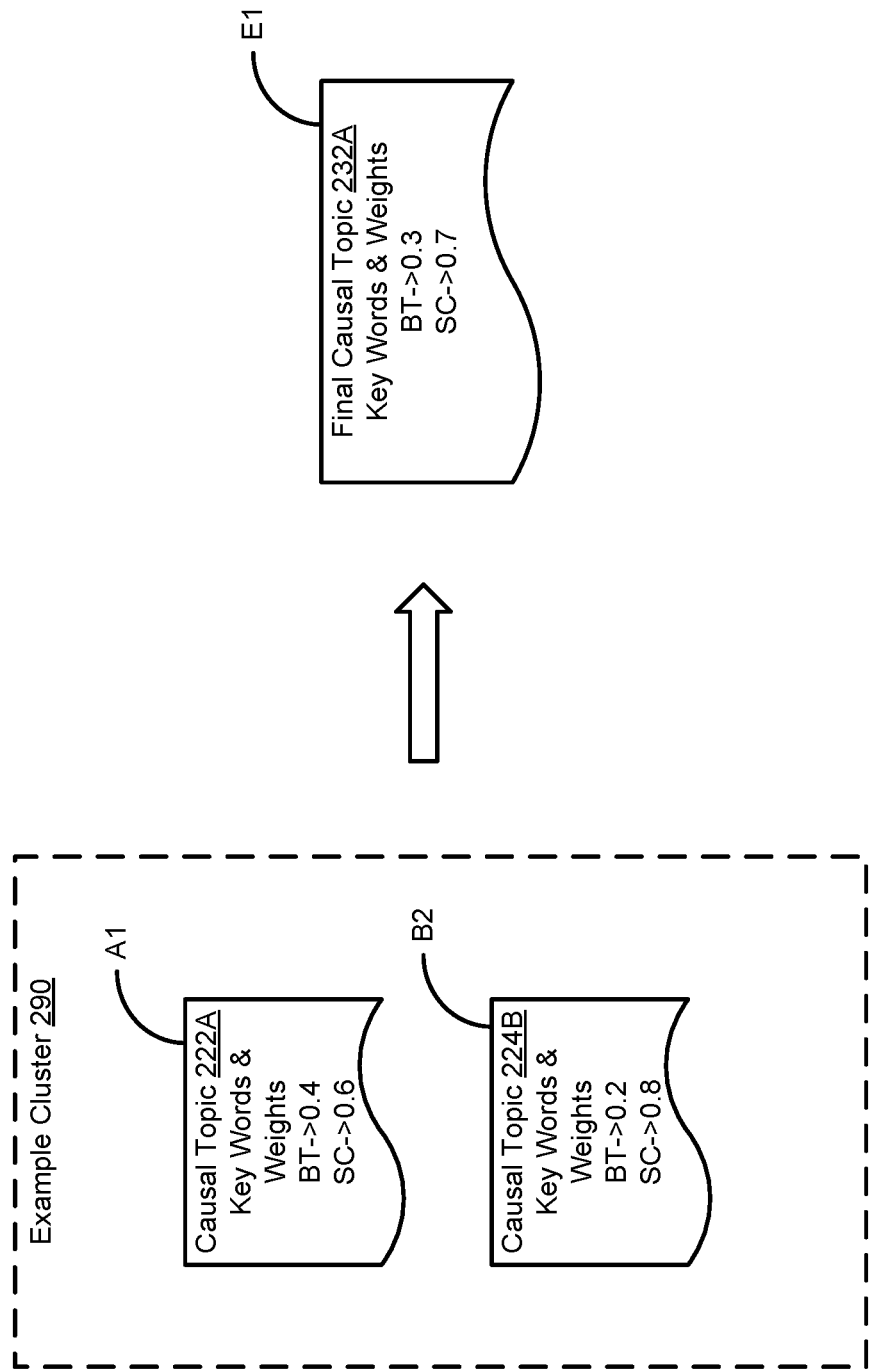

For example, turning to FIG. 2E, a fifth data flow diagram illustrating an example cluster 290 and corresponding final causal topic 232A in accordance with an embodiment is shown.

Consider a scenario where through clustering 230 example cluster 290 is obtained. As seen in FIG. 2E, example cluster 290 may include two causal topics (e.g., 222A, 222B), denoted as A1 and B2, as discussed above to indicate that these two topics were clustered from two different topic batches derived from two different types of causal models. The causal topics (e.g., 222A, 224B) may be identified as members of example cluster 290 during clustering 230 because they both propose a similar explanation (e.g., that variables BT and SC are explanatory) for the undesired operation of a type of job.

Now, consider an example where a cluster size threshold of two members is enforced. In this scenario, example cluster 290 meets the cluster size threshold. Consequently, the members of example cluster 290 are subjected to statistical analysis to obtain final causal topic 232A. The statistic analysis may be, for example, to average the weights associated with each of the explanatory variables. In his example, the values of BT of 0.4 and 0.2 (from the causal topics in the cluster) are averaged to obtain a value of 0.3 for BT for final causal topic 232A, and the values of SC of 0.6 and 0.8 are averaged to obtain a value of 0.7 for SC for final causal topic 232A. In FIG. 2E, final causal topic 232A is designated as E1 to indicate that it is derived from two different models (e.g., a dependence model and a causal model).

The process may be repeated to obtain any number of final causal topics. However, as noted above, clusters having membership that falls below a threshold may not be used as a basis for final causal topics.

Figure 2F:
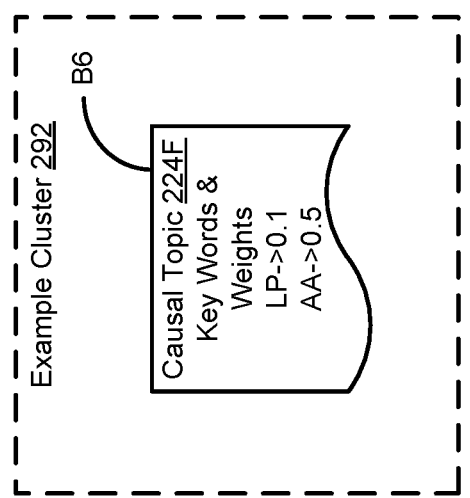

For example, turning to FIG. 2F, a sixth data flow diagram illustrating an example cluster 292 in accordance with an embodiment is shown. As seen in FIG. 2F, example cluster 295 may only include a single member (e.g., an outlier that is not clustered with other causal topics, causal topic 224F) which falls below the example cluster size threshold of two. In this scenario, no final causal topic may be obtained using causal topic 224F.

Through clustering 230, the resulting final causal topics 232 may exhibit reduced bias introduced by different types of models used during causality profile models 210. Accordingly, the resulting final causal topics 232 may be more likely to accurate explain undesired operations of managed systems.

Returning to the discussion of FIG. 2A, once final causal topics 232 are obtained, root cause analysis 240 may be performed. Root cause analysis 240 may include identifying a narrowed set of root causes based on the explanatory variables of final causal topics 232.

For example, for a given type of undesired operation, the explanatory variables included in the corresponding final causal topics may be treated as potential root causes for the undesired operation.

Root cause analysis 240 may be performed through a fully automated process, a semi-automated process, and/or through a manual process. For example, in the fully automated process, the identifiers of the explanatory variables may be used an indicators of the root causes for the undesired operation.

In another example, in the semi-automated process, the explanatory variables may be displayed to a services representative, subject matter expert, and/or other person who may refine (e.g., remove) the explanatory variables. The refined explanatory variables may be used as the root causes.

In a further example, in the manual process, a subject matter expert, services representative, or other person may review the explanatory variables for an undesired operation and may derive a set of root causes based on their knowledge and the variables.

For a given job for which an undesired operation has occurred, the final causal topics corresponding to the job may be identified using the topic mapping to the jobs, discussed in FIG. 2D. For example, for example, the final causal topics derived from the causal topics listed in a topic mapping may be identified as the final causal topics applicable to resolving the root cause for that job.

The root causes identified via root cause analysis 240 may be used to perform Remediation 250. During remediation 250, any number of actions based on the root causes may be performed to attempt to reduce the likelihood of undesired operations from occurring the in future. The actions performed may be selected, for example, by a manual or automated process. For example, a subject matter expert may select the actions, a lookup in a data structure that associates the explanatory variables with actions may be performed to identify the actions, etc. Thus, an action set may then be performed.

The actions set may include any number and types of actions. The actions may include, for example, changes to configurations hosted by a managed system, changes in software hosted by the managed system, changes in schedule procedures for the jobs, etc.

In an embodiment, RMS 104 is implemented using a hardware device including circuitry. The hardware device may be, for example, a digital signal processor, a field programmable gate array, or an application specific integrated circuit. The circuitry may be adapted to cause the hardware device to perform the functionality of RMS 104 such as any of the processes discussed with respect to FIGS. 2A-2F. RMS 104 may be implemented using other types of hardware devices without departing embodiment disclosed herein.

In an embodiment, RMS 104 is implemented using a processor adapted to execute computing code stored on a persistent storage that when executed by the processor performs the functionality of RMS 104 discussed throughout this application such as the processes discussed with respect to FIGS. 2A-2F. The processor may be a hardware processor including circuitry such as, for example, a central processing unit, a processing core, or a microcontroller. The processor may be other types of hardware devices for processing information without departing embodiment disclosed herein.

In an embodiment, RMS 104 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed with respect to FIGS. 2A-2F. Any of these data structures may be implemented using, for example, lists, tables databases, linked lists, unstructured data, and/or other types of data structures.

As discussed above, the components of FIG. 1 may perform various methods to manage customer-encountered issues. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of attempting to remediate an impairment of a job in accordance with an embodiment is shown. The method may be performed by RMS 104 or other components of the system shown in FIG. 1. The impairment may be an undesired operation based on a job performed by a managed system that fails to meet an evaluation criteria for completion of the job.

At operation 300, job traces for instances of a type of a job are obtained. The job traces may be obtained by reading them from storage, receiving them from other devices, and/or by generating them.

At operation 302, causality profile modeling on the job traces is performed to obtain causality profile batches. The causality profile modeling may be performed by ingesting the job traces into causality models. The causality models may output causality profiles. The causality profiles output by each of the causality models may be aggregated to obtain respective causality profile batches.

One of the causal models may identify dependencies between explanatory variables and response variables of each job trace to obtain a first set of dependencies, and generate a first causality profile of a first causality profile batch of the causality profile batches using the first set of dependencies. Another causal model may identify causal relationships based on the explanatory variables and the response variables of the job trace to obtain a first set of causal relationships, and generate a second causality profile of a second causality profile batch of the causality profile batches using the first set of causal relationships.

The first causality profile may include quantifications (e.g., weights) regarding dependency of a response variable of the response variables with respect to the explanatory variables. The response variable may be based on the impairment (e.g., may represent the impairment). The second causality profile may include quantifications regarding causal effect of the response variable with respect to the explanatory variables.

At operation 304, topic modeling on each of the causality profile batches is performed to obtain causal topic batches corresponding to the causality profile batches. The topic modeling may be performed by treating each causality profile of each causality profile batch as a mixture of topics, and each of the topics as a mixture of words, and performing a statistic inferencing process to identify a distribution of the topics, and word probabilities for the topics. For example, the LDA process may be performed to identify topics, words for the topics, and weights for the words.

At operation 306, clustering is performed on the causal topic batches to obtain final causal topics. The clustering may be performed by establishing clusters based on explanatory variables included in the causal topics of the causal topic batches. The clusters may be established, for example, via agglomerative hierarchical clustering or other clustering processes.

For example, the clusters may be established by grouping causal topics having similar explanatory content (e.g., variables) regarding the impairment that is similar within a threshold of each other. The threshold may be with respect to the weights of the explanatory variables that define the explanatory content. Thus, causal topics that include similar explanatory variables but that different from each other by the threshold may not be clustered together.

The clusters then be filtered based on one or more criteria (e.g., to exclude outliers and/or low membership count clusters) to obtain a final set of clusters. The criteria may be, for example, the size of the clusters thereby excluding causal topics A final causal topic of the final causal topics may be obtained using the final set of clusters. For example, the members of each cluster of the final set of clusters may be statistically analyzed to obtain a final causal topic having explanatory variables with weights obtained via the statistical analysis. The final causal topics obtained for each cluster of the final set of clusters may be aggregated to obtain the final causal topics.

At operation 308, a root cause analysis for the impairment of the job or the type of the job is performed using the final causal topics. The root cause analysis may be performed by (i) identifying causal topics that likely contributed to the impairment, and (ii) using explanatory variables from the final causal topics associated with the identified causal topics as identifying a narrowed set of root causes. The narrowed set of root causes may be subsequently used to attempt to remediate the impairment with respect to future jobs of the type of the job.

At operation 310, an action set based on the root cause analysis to reduce a likelihood of future jobs of the type of the job being impaired is performed. The action set may be performed by (i) selecting any number of actions based on the narrowed set of root causes and (ii) performing the selected actions.

The method may end following operation 310.

Using the method illustrated in FIG. 3, a system in accordance with an embodiment may be more likely to successfully identify actual root causes of impairments leading to undesired operation of managed systems. The actual root causes may then be used to perform actions sets to remediate the actual root causes thereby reducing the time to remediate the impairments.

Figure 4:
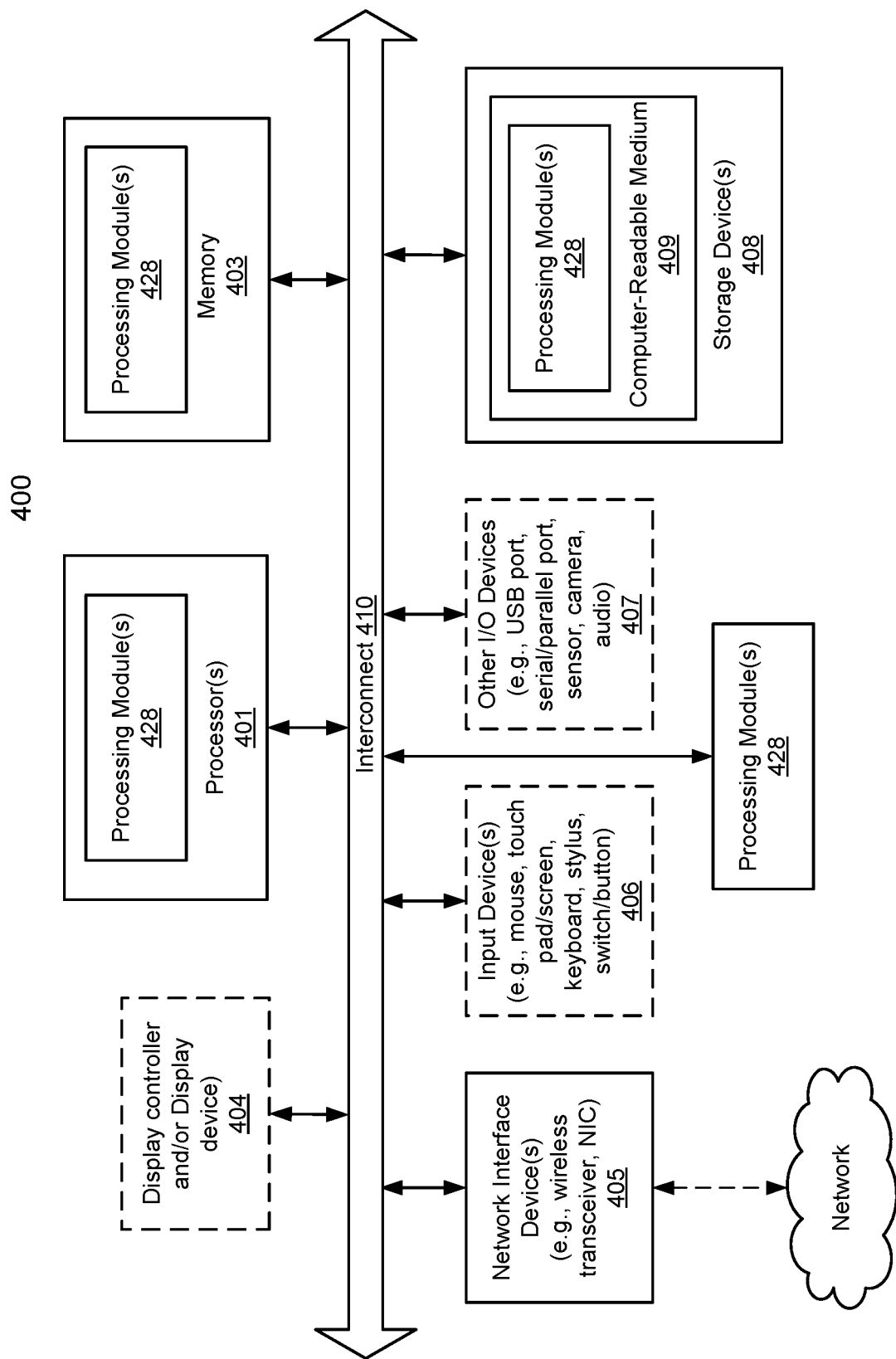
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing job impairments, the method comprising:
   obtaining job traces for instances of a type of a job;
   performing causality profile modeling on the job traces to obtain causality profile batches, each batch of the causality profile batches being obtained using a same modeling technique;
   performing topic modeling on each of the causality profile batches to obtain causal topic batches corresponding to the causality profile batches;
   performing clustering on the causal topic batches to obtain final causal topics;
   performing root cause analysis for an impairment of a job of the type of the job using the final causal topics; and
   performing an action set based on the root cause analysis to reduce a likelihood of future jobs of the type of the job being impaired.

2. The method of claim 1, wherein performing the causality profile modeling comprises:
for a job trace of the job traces:
identifying dependencies between explanatory variables and response variables of the job trace to obtain a first set of dependencies;
generating a first causality profile of a first causality profile batch of the causality profile batches using the first set of dependencies;
identifying causal relationships based on the explanatory variables and the response variables of the job trace to obtain a first set of causal relationships; and
generating a second causality profile of a second causality profile batch of the causality profile batches using the first set of causal relationships.

3. The method of claim 2, wherein the first causality profile comprises quantifications regarding dependency of a response variable of the response variables with respect to the explanatory variables, and the response variable is based on the impairment.

4. The method of claim 3, wherein the second causality profile comprises quantifications regarding causal effect of the response variable with respect to the explanatory variables.

5. The method of claim 4, wherein performing the topic modeling comprises:
for the first causality profile batch:
treating each causality profile of the first causality profile batch as mixture of topics, and each of the topics as a mixture of words; and
performing a statistic inferencing process to identify a distribution of the topics, and word probabilities for the topics.

6. The method of claim 5, wherein performing the clustering on the causal topic batches to obtain the final causal topics comprises:
identify a first causal topic that is an outlier; and
excluding the first causal topic from the final causal topics.

7. The method of claim 6, wherein performing the clustering on the causal topic batches to obtain the final causal topics further comprises:
identifying a set of causal topics of the causal topic batches that each have explanatory content regarding the impairment that is similar within a threshold of each other; and
obtaining a final causal topic based on the set of causal topics.

8. A non-transitory machine-readable medium having instructions stored therein, which when executed by a processor, cause the processor to perform operations for managing job impairments, the operations comprising:
obtaining job traces for instances of a type of a job;
performing causality profile modeling on the job traces to obtain causality profile batches, each batch of the causality profile batches being obtained using a same modeling technique;
performing topic modeling on each of the causality profile batches to obtain causal topic batches corresponding to the causality profile batches;
performing clustering on the causal topic batches to obtain final causal topics;
performing root cause analysis for an impairment of a job of the type of the job using the final causal topics; and
performing an action set based on the root cause analysis to reduce a likelihood of future jobs of the type of the job being impaired.

9. The non-transitory machine-readable medium of claim 8, wherein performing the causality profile modeling comprises:
for a job trace of the job traces:
identifying dependencies between explanatory variables and response variables of the job trace to obtain a first set of dependencies;
generating a first causality profile of a first causality profile batch of the causality profile batches using the first set of dependencies;
identifying causal relationships based on the explanatory variables and the response variables of the job trace to obtain a first set of causal relationships; and
generating a second causality profile of a second causality profile batch of the causality profile batches using the first set of causal relationships.

10. The non-transitory machine-readable medium of claim 9, wherein the first causality profile comprises quantifications regarding dependency of a response variable of the response variables with respect to the explanatory variables, and the response variable is based on the impairment.

11. The non-transitory machine-readable medium of claim 10, wherein the second causality profile comprises quantifications regarding causal effect of the response variable with respect to the explanatory variables.

12. The non-transitory machine-readable medium of claim 11, wherein performing the topic modeling comprises:
for the first causality profile batch:
treating each causality profile of the first causality profile batch as mixture of topics, and each of the topics as a mixture of words; and
performing a statistic inferencing process to identify a distribution of the topics, and word probabilities for the topics.

13. The non-transitory machine-readable medium of claim 12, wherein performing the clustering on the causal topic batches to obtain the final causal topics comprises:
identify a first causal topic that is an outlier; and
excluding the first causal topic from the final causal topics.

14. The non-transitory machine-readable medium of claim 13, wherein performing the clustering on the causal topic batches to obtain the final causal topics further comprises:
identifying a set of causal topics of the causal topic batches that each have explanatory content regarding the impairment that is similar within a threshold of each other; and
obtaining a final causal topic based on the set of causal topics.

15. A data processing system, comprising:
a processor; and
a memory coupled to the processor to store instructions, which when executed by the processor, cause the processor to perform operations for managing job impairments, the operations comprising:
obtaining job traces for instances of a type of a job;
performing causality profile modeling on the job traces to obtain causality profile batches, each batch of the causality profile batches being obtained using a same modeling technique;
performing topic modeling on each of the causality profile batches to obtain causal topic batches corresponding to the causality profile batches;
performing clustering on the causal topic batches to obtain final causal topics;

performing root cause analysis for an impairment of a job of the type of the job using the final causal topics; and performing an action set based on the root cause analysis to reduce a likelihood of future jobs of the type of the job being impaired.

16. The data processing system of claim 15, wherein performing the causality profile modeling comprises:

for a job trace of the job traces:
- identifying dependencies between explanatory variables and response variables of the job trace to obtain a first set of dependencies;
- generating a first causality profile of a first causality profile batch of the causality profile batches using the first set of dependencies;
- identifying causal relationships based on the explanatory variables and the response variables of the job trace to obtain a first set of causal relationships; and
- generating a second causality profile of a second causality profile batch of the causality profile batches using the first set of causal relationships.

17. The data processing system of claim 16, wherein the first causality profile comprises quantifications regarding dependency of a response variable of the response variables with respect to the explanatory variables, and the response variable is based on the impairment.

18. The data processing system of claim 17, wherein the second causality profile comprises quantifications regarding causal effect of the response variable with respect to the explanatory variables.

19. The data processing system of claim 18, wherein performing the topic modeling comprises:

for the first causality profile batch:
- treating each causality profile of the first causality profile batch as mixture of topics, and each of the topics as a mixture of words; and
- performing a statistic inferencing process to identify a distribution of the topics, and word probabilities for the topics.

20. The data processing system of claim 19, wherein performing the clustering on the causal topic batches to obtain the final causal topics comprises:
- identify a first causal topic that is an outlier; and
- excluding the first causal topic from the final causal topics.

* * * * *